(No Model.)

E. C. POHLE.
PROCESS OF SEPARATING MATTE FROM SLAG.

No. 484,570. Patented Oct. 18, 1892.

WITNESSES
G. J. Ollaudet
J. Dawson Hawkins.

INVENTOR
Edwin C Pohle
BY A. J. O'Brien
ATTORNEY.

UNITED STATES PATENT OFFICE.

EDWIN C. POHLE, OF DENVER, COLORADO.

PROCESS OF SEPARATING MATTE FROM SLAG.

SPECIFICATION forming part of Letters Patent No. 484,570, dated October 18, 1892.

Application filed January 16, 1892. Serial No. 418,336. (No specimens.)

*To all whom it may concern:*

Be it known that I, EDWIN C. POHLE, a citizen of the United States of America, residing at Denver, in the county of Arapahoe and State of Colorado, have invented certain new and useful Improvements in Processes of Separating Matte from Slag; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improved process or method for separating matte from slag; and the object of the improvement is to deprive the slag of a greater per cent. of its valuable material than can be accomplished by the old methods, whereby the loss is reduced to a minimum. In the smelting of argentiferous ores containing lead and often small quantities of copper large amounts of a matte are produced, and this product often contains proportions of silver above fifty ounces per ton of matte. In order to save this matte, the mixed molten slag and matte are run into a large iron pot, where the matte settles by virtue of its greater specific gravity. The slag, which is the lighter product, is drawn off at the top of the pot. The processes now in use do not give the slag sufficient opportunity to deposit its valuable material, which is interspersed matte in particles.

My process is to cause a more perfect separation in order that the slags may be further impoverished of the silver they contain, as heretofore stated.

In the accompanying drawings is illustrated a suitable construction for carrying out my improved process.

Figure 1:
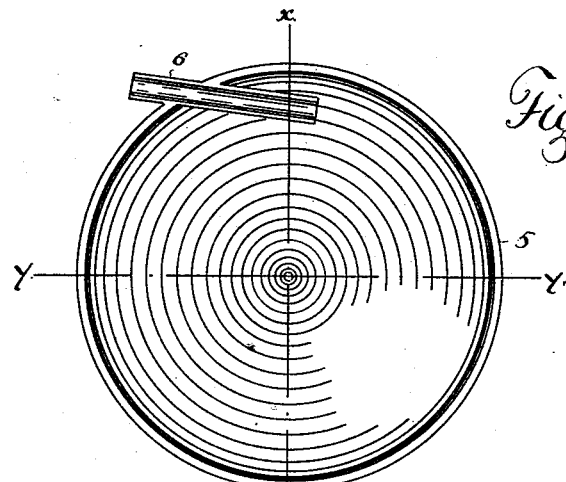
Figure 3:
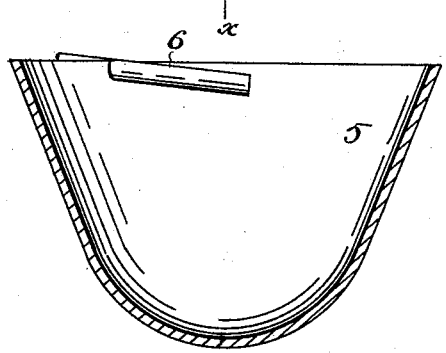
Figure 2:
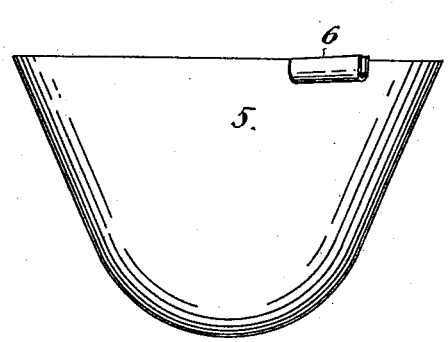

Figure 1 of the drawings is a top view of the pot or vessel into which the molten mass composed of slag and matte is conducted. Fig. 2 is a side elevation of the same. Fig. 3 is a vertical section taken on line $y\,y$, Fig. 1.

Similar reference characters indicating corresponding parts or elements in the several views, let the numeral 5 designate the body of the pot, preferably having the inner surface of its wall regularly curved or semispherical in shape. At a suitable point in the upper portion of the wall of this pot is introduced an inlet spout, trough, or conduit 6, through which the molten mass is discharged. The portion of this inlet spout or conduit located within the vessel is designed to conduct the molten slag and matte against the side of the pot in a direction forming an oblique angle with the tangent of the wall's curve. By this means the stream or current of molten material takes a spirally-directed downward course to the bottom of the matte-pot where the matte is to settle according to its specific gravity. This process is carried on without agitating the matte which has already settled to the bottom of the pot.

Were the mixed molten mass directed into the pot at right angles to a tangent line on the circumference of the top of the pot, or were it directed down into the mass of material by means of a pipe bent at any angle, the matte which has previously settled would be stirred up. However, by my improved method the movement of the molten material around the inner surface of the pot to the bottom does not disturb what is already there, and hence occasions a more nearly complete separation. This principle may be applied to any liquid mixture of materials possessing varying specific gravities.

Having thus described my invention, what I claim is—

The herein-described method or process for separating matte from slag, consisting in causing the molten mass when discharged into the pot or vessel to take a spirally-directed downward course in proximity to the wall of the vessel, whereby the matte is carried to the bottom without disturbing or agitating that which has already collected therein, substantially as described.

In testimony whereof I affix my signature in presence of two witnesses.

EDWIN C. POHLE.

Witnesses:
 EDWIN N. HAWKINS,
 J. DAWSON HAWKINS.